United States Patent [19]

McCarthy et al.

[11] 3,994,658

[45] Nov. 30, 1976

[54] CLAM STRIP EXTRUDER APPARATUS

[75] Inventors: John P. McCarthy, College Point; Joseph Chin, Elmhurst, both of N.Y.

[73] Assignee: DCA Food Industries Inc., New York, N.Y.

[22] Filed: Nov. 29, 1974

[21] Appl. No.: 528,568

[52] U.S. Cl. .............................. 425/464; 425/309; 425/382 R
[51] Int. Cl.² ......................................... A21C 11/16
[58] Field of Search ........... 425/287, 288, 309, 464, 425/380, 382, 310, 314

[56] References Cited
UNITED STATES PATENTS

| | | | |
|---|---|---|---|
| 1,670,230 | 5/1928 | Baumann | 425/287 |
| 2,126,416 | 8/1938 | Schlichter | 425/288 |
| 2,148,003 | 2/1939 | Wurtzel | 425/464 |
| 2,635,560 | 4/1953 | Coyne | 425/288 |
| 2,772,643 | 12/1956 | Coyne | 425/288 X |
| 3,016,568 | 1/1962 | Gagne | 425/464 X |
| 3,052,193 | 9/1962 | Gilmore | 425/287 X |

*Primary Examiner*—Ronald J. Shore
*Attorney, Agent, or Firm*—Amster & Rothstein

[57] ABSTRACT

An extruder for simultaneously forming a plurality of clam strip shapes from a single source of extrudable material including particles of clams therein. The extruder includes a nozzle body which terminates in a nozzle opening and a forming member in operative relation thereto for use in forming the extruder product. A divider member within the nozzle body divides the nozzle opening into a plurality of nozzle openings and also divides the forming member into a plurality of forming members. The divider member extends upstream within the nozzle body to an upstream end which is maintained free of clam particles by virtue of a deflecting member which is mounted on the upstream end thereof. The upstream end of the deflecting member presents a downstream convex surface to the extrudable material and thereby prevents accumulation of the clam particles on the upstream end of the divider.

8 Claims, 10 Drawing Figures

CLAM STRIP EXTRUDER APPARATUS

The present invention relates generally to extruders, and in particular, to an extruder for simultaneously extruding a plurality of extruded foodstuff shapes from a single source of extrudable material.

Various extruders for forming foodstuff shapes from extrudable mixtures have been available in the market for many years.

Included among the foodstuff extruders which have been available are those which extrude homogeneous foodstuff mixtures into specific desired shapes such as stars to be further processed such as by being baked. Such homogeneous foodstuff extruders have been relatively simple in construction with the shape of the food product to be extruded being virtually the sole variable design parameter affecting the construction of the extruder and rendering it different from prior extruders.

Of recent times, a number of extruders have entered the market wherein a food product shape is simulated. These simulated shapes are formed from a mixture of a foodstuff which contains chopped, ground or comminuted particles of the actual foodstuff whose shape is being simulated in combination with a filler or binder material along with other ingredients.

The popularity of the use of extruders for foodstuff mixtures which contain divided particles of the actual foodstuff of the shape to be simulated can be attributed, in part, to the desire of the consuming public for foods which have the taste, texture and appearance of the "real" foodstuffs but which are easier and less expensive to prepare.

An example of one of the last-mentioned extruders is shown and described in U.S. Pat. No. 3,814,560, assigned to the assignee of the present invention. In the aforementioned patent an extruder is disclosed for formation of a ring which simulates an onion ring and which is formed of an extruded food core and a gelled envelope. The extruded food product is formed from a mixture which includes comminuted pieces of onion mixed with, among other ingredients, a gel-forming material. In accordance with the apparatus and method shown in the aforementioned patent the mixture is extruded into the shape of a toroid while the surface thereof is washed with a gelation agent or setting solution to form the gelled envelope thereabout.

In addition to the factors noted hereinbefore, among the other reasons for the popularity of formed food products simulating actual shapes of familiar foods including pieces of the actual foods therein has been the concern for eliminating needless waste.

Specifically, when certain foodstuffs are prepared for consumption, certain less-desirable-appearing portions thereof are cut away and discarded. Often, the discarded portions are fully as nutritious and flavorful as the better appearing, retained portions. However, owing to the unappetizing appearance of the discarded portions, they have largely been unused.

The invention such as the one disclosed in the aforementioned U.S. patent is an example of the one extruder which makes use of normally-discarded food particles and fashions them into an attractive, flavorful, formed food product.

While it is desirable for numerous reasons to make use of normally-discarded parts of desirable foodstuffs, the same is not always possible owing to problems inherent in the nature of the foodstuff which prevents full utilization thereof. For example, certain simulated foodstuff shapes, such as fried clam strips, do not lend themselves to production by the normal or usual extruder if accurate, economical simulation of a clam strip shape is to be achieved.

Unlike the onion ring formed by the apparatus shown in the aforementioned U.S. patent, an actual clam strip is generally not in the shape of a complete toroid. Consequently, in order to manufacture or simulate a realistic-appearing formed clam strip, it is necessary to extrude a simulated clam strip which is but a segment of a toroid, i.e, an accurate solid.

Naturally, an extruder which would produce only one arcuate solid would be most uneconomical to operate and the cost of the product formed thereby would be prohibitively high.

Attempts have been made to decrease the cost thereof, such as by producing a plurality of arcuate solids from a single extrusion source. However, the peculiar nature of the foodstuff mixture necessary for forming clam strips has prevented an efficient, economical solution.

For example, in order to be salable, an extruded clam strip shape must contain pieces of clams which are sufficiently large to provide the proper "chewy" texture to the final product to simulate that present in the "natural" product. Provision of an extrudable mixture containing pieces of claim therein big enough to provide the required "chewiness" or "bite" for the simulated finished product prevents satisfactory production of a plurality of formed clam strips from a single source of supply.

Owing to the resilient nature of the clam particles contained in the aforementioned extrudable mixture, any attempt at dividing the extrudable mixture from a single source of supply into a plurality of parts for the simultaneous formation of the extruded shapes has resulted in undesired build-up of material at the dividing point eventually resulting in clogging of the extruder.

An alternate solution, of extruding a single toroidal-shaped product and processing the same into two or more strips, adds unnecessarily to the cost and is likewise unsatisfactory.

In addition, one of the requisites for an acceptable, commercially salable simulated clam strip is that its shape simulate, as closely as possible, the natural clam strip shape. Naturally, such shape simulation requires that the formed shape include the convolutions possessed by the natural clam strip.

Accordingly, it is a general object of the present invention to provide an apparatus for simultaneously extruding a plurality of arcuate solids from an extrudable mixture including clam pieces therein which overcomes the difficulties noted hereinbefore.

It is a more particular object of the present invention to provide an extruder for simultaneously extruding a plurality of arcuate shaped solids simulating clam strips from a single source of extrudable material including clam pieces therein, wherein said extruder can operate for an extended period of time without the necessity for interrupting the extrusion process to clear a build-up of clam pieces in the extruder thereby continously proving simulated, formed clam strips of uniform size.

It is a further object of the present invention to provide an extruder for simultaneously forming a plurality of arcuate solid shapes from an extrudable mixture including clam pieces therein which formed shapes closely resemble actual clam strips in the convoluted shape thereof.

It is a still further object of the present invention to provide an extruder for simultaneously extruding a plurality of claim-strip-shaped solids from an extrudable mixture containing clam pieces therein which is simple and economical to manufacture, and simple to disassemble, clean and reassemble.

In accordance with an illustrative embodiment demonstrating objects and features of the present invention, there is provided an extruder for simultaneously forming a plurality of food products from an extrudable material having resilient particles therein. The extruder comprises a source of said extrudable material and has a nozzle body which terminates in a nozzle opening and which defines an extrusion chamber adapted to be connected in communication said source. Means are provided for controlling the amount of the extrudable material to be extruded through the nozzle opening. The means for controlling the amount of the extrudable material to be extruded included a product-forming member mounted in operative relation to the nozzle opening and coacting therewith in the formation of the plurality of food products. Divider means are mounted in operative relation both to the nozzle opening and to the product-forming member. The divider means is constructed and arranged to divide the nozzle opening into a plurality of discrete nozzle openings. The divider means is also constructed and arranged to correspondingly divide the product-forming members, each connected in communication with the source of the extrudable material and each forming one of the plurality of food products. The divider means extends upstream within the primary extrusion chamber and terminates at an upstream end spaced from the forming member. A deflecting member is fixed to the divider means at the upstream end thereof. The deflecting member constructed and arranged to ensure a smooth flow of the extrudable material from the source through the extrusion member toward the plurality of nozzle openings and for preventing accumulation of the resilient particles on the upstream end of the divider member.

The above description as well as further objects, features and advantages of the present invention will be more fully understood by reference to the following detailed description of the presently preferred but nonetheless illustrative embodiments in accordance with the present invention, when taken in connection with the accompanying drawing; wherein.

Figure 5:
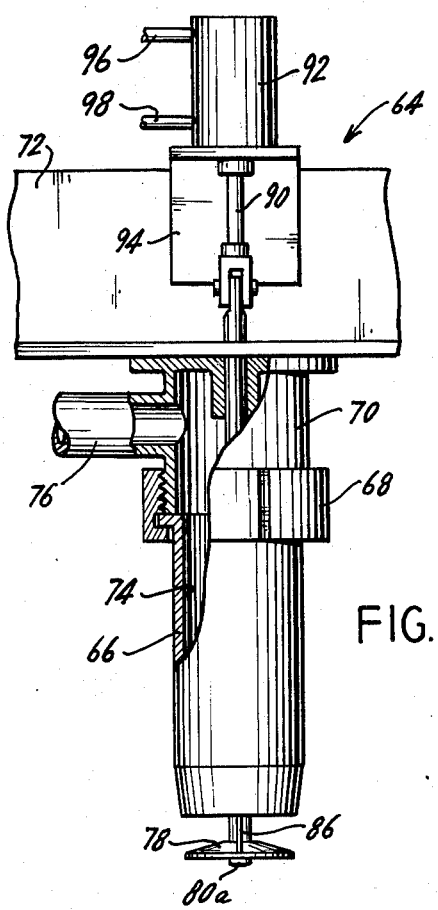
Figure 2:
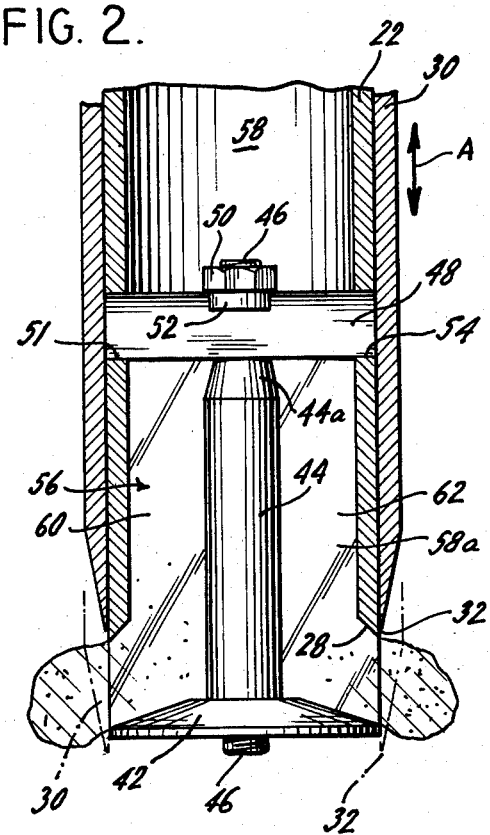
FIG. 2 is an enlarged fragmentary sectional view taken substantially along the line 2—2 of FIG. 1, and looking in the direction of the arrows.
Figure 6:
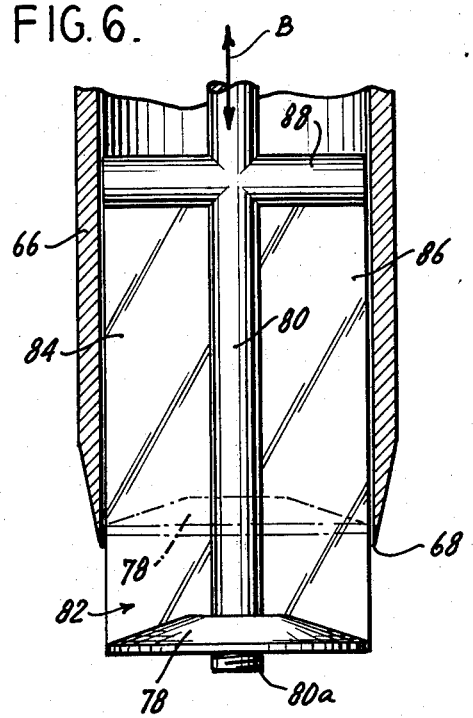
Figure 10:
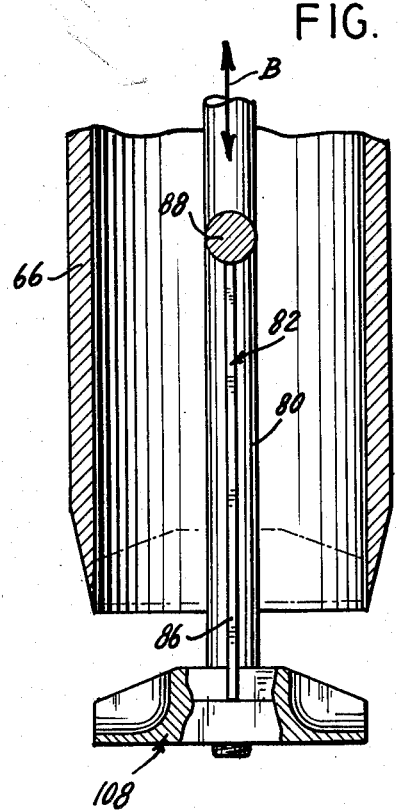
Figure 7:
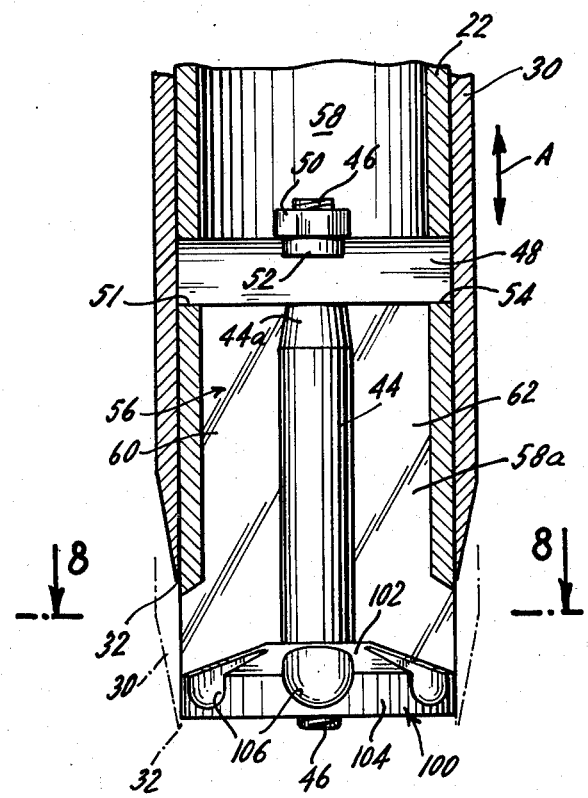
Figure 8:
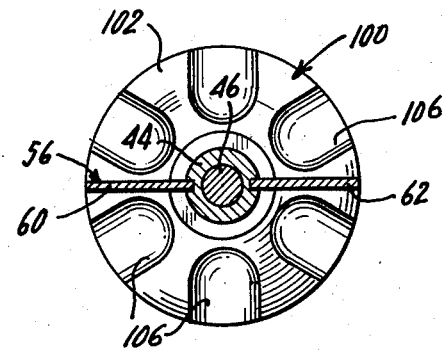
Figure 9:
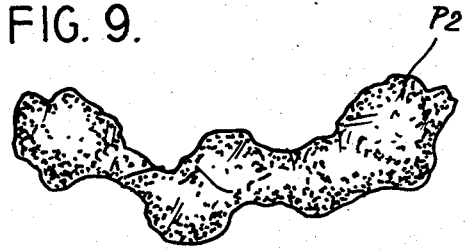

FIG. 5. is an elevational view, with parts broken away and shown in section, of an alternate form of an extruder constructed in accordance with the present invention;

FIG. 6 is an enlarged fragmentary sectional view, similar to FIG. 2, of the extruder of FIG. 5;

FIG. 7 is an enlarged fragmentary sectional view of the extruder of FIG. 2 including an alternate form of an extruder forming member;

FIG. 8 is a sectional view taken substantially along the line 8—8 of FIG. 7 and looking in the direction of the arrows;

FIG. 9 is a top view of a formed arcuate solid extruded from the extruder and forming member shown in FIG. 7; and, FIG. 10 is an enlarged fragmentary sectional view of the extruder of FIG. 5 including an alternate form of an extruder forming member.

Figure 1:
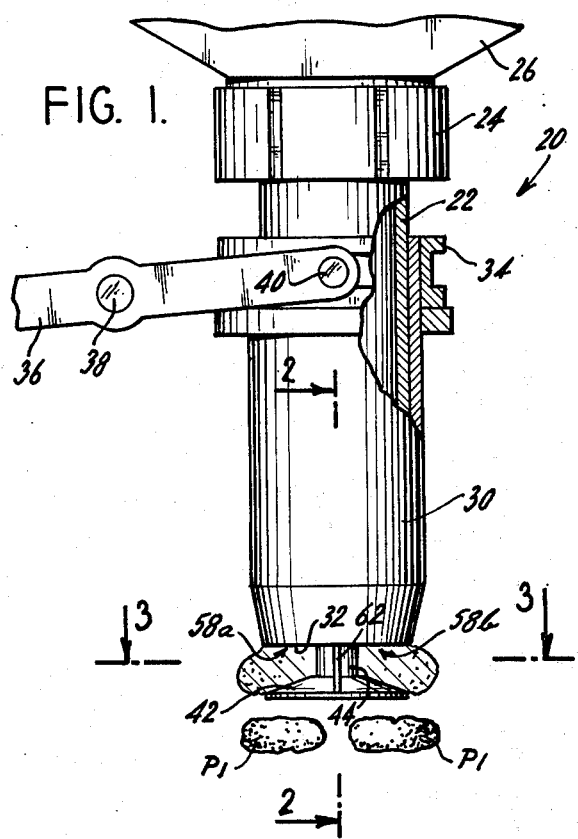
FIG. 1 is an elevational view, with parts broken away and shown in section, of an extruder including a forming member constructed in accordance with the present invention.

Referring now specifically to the drawing, the first to FIG. 1, in accordance with an illustrative embodiment demonstrating objects and features of the present invention, there is a provided an extruder, generally designated by the reference numeral 20, which includes a generally cylindrical nozzle body 22. The upper end of the nozzle body 22 is fixed by means of a threaded mounting collar 24 to the lower, delivery end of source of extrudable material within a hopper 26.

The lower end of the nozzle body 22 terminates in a lower edge 28 (see FIG. 2) which forms a nozzle opening or orifice for the nozzle body 22, the operation of which will be described in detail hereinafter.

In the extruder 22 shown in FIGS. 1 and 2, a movable, generally cylindrical cutter sleeve 30 is mounted about the exterior of the nozzle body 22 for reciprocation in the direction of the directional arrows A shown in FIG. 2 in a manner and for a purpose to be described hereinafter. As may be seen by reference to FIGS. 1 and 2, the lower edge of the cutter sleeve 30 terminates in a cutter edge 32.

A circumferentially grooved follower collar 34 is swaged or otherwise affixed to the upper end of the cutter sleeve 30 (see FIG. 1). A double arm, cutting-sleeve-actuating lever 36 is pivotably mounted on pivot 38. The arms of the lever 36 extend about both sides of the collar 34 and each carried a follower roller 40 which is rotatably fixed to the rightmost end thereof.

By virtue of the arrangement of the lever 36, the pivot 38, the rollers 40 and the collar 34, it will be appreciated that movement of the actuating lever 36 about the pivot 38 results in reciprocation of the cutter sleeve in the direction of the directional arrows A as shown in FIG. 2. The specific function and timing of the reciprocation of the cutter sleeve 30 will be discussed in greater detail hereinafter.

A cutter disc 42, which performs the function of aiding in the formation of the finished product as will be discussed hereinafter, is generally frusto-conical in its upper or upstream surface configuration and is of substantially the same radial extent as is the interior of the cutter sleeve 30. The cutter disc 42 includes a central opening therein which has a central axis.

A cutter disc mounting rod 44 (see FIG. 2) is mounted with its longitudinal axis coaxial with the longitudinal axis of the nozzle body 22. The cutter disc 42 is fixed against the lower or downstream end of the mounting rod 44 by inserting the cutter disc opening on the lower end of a threaded rod 46 and is held in place against the mounting rod 44 by a retaining nut (not shown) which is threaded upon the threaded rod 46. The threaded rod 46 in turn, extends upwardly through the center of the mounting rod 44 projecting beyond the upper or upstream end thereof as may be seen in FIG. 2.

The upstream end of mounting rod 44 tapers to a generally frusto conical section 44a which abuts the lower edge of a deflecting bar 48. In the illustrative embodiment of the extruder 20 shown in FIGS. 1, 2 and 7, the deflecting bar 48 is generally D-shaped in cross section. The flat surface of the D is lowermost or downstream in the embodiment shown in FIGS. 2 and 7 and the rounded portion of the D is uppermost, confronting the upstream part of nozzle body 22. Naturally, the deflecting bar 48 can be any convenient shape so long as the upstream end is smooth and generally rounded and the remainder of the shape fulfills the flow requirements of the extruder to be discussed in detail hereinafter.

The threaded mounting rod 46 passes through a centrally located opening within the deflecting bar 48 and fixes the mounting rod 44 and the abutting, attached cutter disc 42 to the deflecting bar by a retaining nut 50. The retaining nut 50 is threaded on the upper end of the threaded rod 46 and bears against an appropriately configured washer 52 to fix the mounting rod 44 relative to the deflecting bar 48.

The deflecting bar 48 is, in turn, fixed relative to the nozzle body 22 by being inserted within openings 51, 54 within the nozzle body 22. Consequently, the cutter disc 42, by virtue of the length of the mounting rod 44 is fixed a predetermined distance relative to the nozzle opening formed by the lower edge 28 of the nozzle body 22 for use in formation of the subject formed, extruded food product in a manner to be described hereinafter.

A divider, generally designated by the reference numeral 56 is located within the nozzle body 22 and extends upstream within the nozzle body to the lower surface of the deflecting bar 48 and downstream to abut the upper frustoconical surface of the cutter disc 42. The divider 56 extends within the nozzle body 22 across the entire internal diameter thereof contacting the inner wall of the nozzle body and is configured to conform to the lower edge 28 of the nozzle body 22. Upon exiting from the nozzle body 22, the lower, radially outermost edges of the divider 56 are radially coextensive with the exterior surface of the nozzle body 22.

The divider 56 consequently separates the extrusion chamber 58 defined by the interior of the nozzle body 22 into two extrusion chambers 58a, 58b below the deflecting bar 48 (see FIGS. 1 and 2).

Figure 3:
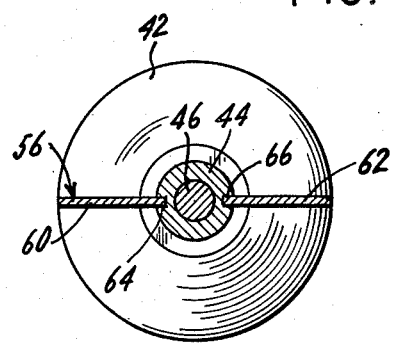
FIG. 3 is an enlarged sectional view taken substantially along the line 3—3 of FIG. 1 and looking in the direction of the arrows.

In the illustrative embodiment of the extruder 20 illustrated in FIGS. 1 and 2, the divider 56 is fashioned from two separate divider vanes 60, 62 which are mounted at their radially inner, axially extending edges within grooves 64, 66 within mounting rod 44 (see FIG. 3).

Naturally, if it is desired, the mounting rod 44 and the divider 56 may be fashioned as one piece. In a similar manner, the mounting rod 44, the divider 56 and the cutter disc 42 may all be fashioned as one piece. However, in the illustrative embodiment described herein, the elements are separate, individual elements which are assembled to function as a divider means in conjunction with the deflecting bar 48 and the interior of the nozzle body 22.

As may be noted by reference to FIGS. 1, 2 and 3, the divider 56 not only divides the single extrusion chamber 58 into two extrusion chambers 58a, 58b, but also divides the single nozzle opening formed by the lower edge of the nozzle body 22 into two nozzle openings. In addition, the upper frustoconical surface of the cutter disc 42 is divided by the divider 56 from a single product-forming member into two product forming members. All of the foregoing operate in a manner to be described in greater detail hereinafter.

An extruder, generally designated by the reference numeral 64 is shown in FIGS. 5 and 6. The extruder 64 is merely an alternate embodiment of the illustrative form of the extruder 20 shown in FIGS. 1 and 2 and differs therefrom in the specific implementing structure through the same inventive concept is embodied therein.

The extruder 64 includes a nozzle body 66 which terminates at its lower end in a cutter edge 68 which also forms of defines a nozzle opening.

The upper end of the nozzle body 66 is fixed by a threaded and grooved two-piece collar 68 to an inlet chamber 70. The inlet chamber 70 is, in turn, fixed at its upper end to a mounting beam 72 which may be fixed to any convenient support. The inlet chamber 70 includes an interior chamber therein which is in communication with an extrusion chamber 74 defined by the interior of the nozzle body 66. The inlet chamber 70 is also in communication, through conduit 76, with a source of supply of an extrudable mixture which may be similar to the hopper 26 shown in FIG. 1.

A cutter disc 78, which is substantially similar to the cutter disc 42, includes a generally frusto-conical upper forming surface, is of substantially equal radial extent with the interior of the nozzle body 66 and includes a central opening therein for use in mounting the cutter disc relative to the nozzle body. The opening of the cutter disc 78 is placed about the threaded lower section 80a of a longitudinally extending mounting rod 80. The central upper, generally flat section of the cutter disc 78 abuts a shoulder on the lower or downstream end of the mounting rod 80 formed when the lower threaded section 80a was cut therein. A lower retaining nut (not shown) is threaded on the threaded section 80a of the mounting rod 80 and aids in securely mounting the cutter disc 78 relative to the mounting rod 80. The secure mounting of the cutter disc 78 is aided by the abutting relation which exists between the upper frusto-conical surface of the cutter disc 78 and the lower surface of a divider 82 to be described in greater detail hereinafter.

The divider 82, of the extruder 64 as in the illustrative embodiment of the extruder 20 shown in FIGS. 1 and 2 is fashioned from two separate divider vanes 84, 86 which are housed within recesses within the longitudinally extending mounting rod 80 in much the same manner as the vanes 60, 62 within recesses 64, 66 in the mounting rod 44 (see FIG. 3).

The upstream end of the divider vanes 84, 86 are in abutting relation with a deflecting member or bar 88 which extends transversely across the interior of the nozzle body 66 and which may include grooves within the downstream end to seat the upstream ends of the deflecting vanes 84, 86. The deflecting bar 88 may be of any convenient shape so long as it presents a generally rounded downstream convex surface configuration to the upstream end of the chamber 74 defined by the interior of the nozzle body 66 for a purpose to be described more fully hereinafter.

In the embodiment of the extruder 64 shown in FIGS. 5 and 6, as with the embodiment of the extruder 20 shown in FIGS. 1 and 2, the cutter disc 78, the mounting rod 80 and the deflecting bar 88 may all be fashioned from one piece but are shown as separate, assembled elements herein.

Alternately, the divider 82 may be fashioned from one piece and may be constructed to pass through a transverse, longitudinally extending slot within the mounting rod 80 with the upstream end of the divider 82 being forced to abut the downstream edge of the deflectig bar 88 by the cutter disc forcing the frusto-conical upper surface thereof thereagainst.

The mounting rod 80 extends upstream within the extruder 64 past the deflecting bar 88 and through a bushing formed within the top wall of the inlet chamber 70. The mounting rod 80 also extends upwardly through an opening in the mounting beam 72 where it is fastened, as by being pinned or the like, to a piston rod 90 depending from a double-acting cylinder 92 fixed to the mounting beam 72 by a bracket 94.

The double-acting cylinder 92 is supplied air or other operating fluid through conduits 96, 98 to reciprocate a piston therein thereby reciprocating the attached mounting rod 80 and associated mechanism in the direction of the directional arrows designated by the reference letter B shown in FIG. 6.

The divider 82 of the extruder 64 functions in much the same manner as does the divider 56 of the extruder 20 in that it divides the nozzle opening formed by the cutter edge 68 into a plurality of discrete nozzle openings for use in forming a plurality of discrete food products from a single source of an extrudable mixture. Toward this end, the radially outward extent of the divider 82 is substantially equal to the radially outward extent of the cutter disc 78 and is also substantially equal to the interior radial extent of the nozzle body 66.

As described in greater detail hereinafter, the upper, frusto-conical surface of the cutter discs 42, 78 aid in the formation of a food product which is generally arcuate (at least when originally formed) and which, by virtue of the original extrudable mixture containing resilient particles therein, includes surface irregularities thereon as may be seen by the extruded food product P shown in FIGS. 1 and 4.

If it is desired to impart an even more pronounced irregular surface to the extruded food products than that enjoyed by the product $P_1$ (see FIG. 4). such as that enjoyed by the food product $P_2$ shown in FIG. 9, an alternate form of a cutter disc can be used such as the cutter disc 100 shown in FIGS. 7 and 8.

The cutter disc 100, in a manner similar to the cutter discs 42 and 78, also aids in the formation of a finished formed food product $P_2$. The cutter disc 100 includes a generally frusto-conical upper surface 102 and a generally cylindrical side wall 104.

A plurality of generally hemi-cylindrical depressions 106 appear in the upstream surface of the cutter disc 100 extending downstream into the body thereof. The depressions 106 result in generally semi-circular openings in the cylindrical side wall 104 of the cutter disc (see FIG. 7). The depressions 106 have a generally concave inner surface and include a curved, radially innermost surface as may be seen by reference to FIGS. 7 and 8.

Consequently, what is formed on the upstream surface of the cutter disc 100 is a non-planor surface fashioned from the frusto-conical surface broken by the hemi-cylindrical depressions 106. Naturally, if it is desired, hemi-cylindrical raised areas could be fashioned to protrude upwardly from the frusto-conical surface though the illustrated depressions are preferred.

FIGS. 7 and 8 show the cutter disc 100 affixed to an extruder substantially similar to the extruder 20 shown in FIGS. 1 and 2 with the divider 56 having its downstream end inserted within receiving slots within the cutter disc 100. The cutter disc 100 is held to the lower end of the threaded rod 46 by a retaining nut (not shown) which may be seated against the bottom of the cutter disc 100 within a recess (not shown). Alternately, the cutter disc 100 may be fixed to the downstream end of the threaded rod 44 by any other convenient means such as being internally threaded.

In a similar manner, the cutter disc 108 (see FIG. 10) shown attached to the downstream end 80a of mounting rod 80 of an extruder substantially similar to the extruder 64 shown in FIGS. 5 and 6 is substantially similar to the cutter disc 100 shown in FIGS. 7 and 8. The cutter disc 108 is fixed to the downstream threaded end of the mounting rod 80 in a similar manner to the affixation of the cutter disc 100 to the rod 46.

In operation, the extruder 20 shown in FIGS. 1 and 2 is in communication with a source of extrudable material including resilient particles therein contained within the hopper 26. After initial operation of the extruder 20, the extrudable material fills the entire extrusion chamber 58 defined by the nozzle body 22. The extrudable material may be urged into the extrusion chamber 58 by any convenient supply means such as an auger or air pressure.

As the extrudable material traverses downstream within the extrusion chamber 58, it impinges upon the upstream surface of the deflecting bar 48 which, by virtue of its rounded upstream configuration, causes the extrudable material to bifurcate and flow smoothly on either side thereof without the resilient particles contained within the extrudable material accumulating on the upstream side of the deflecting member.

As the extrudable material within the extrusion chamber 58 moves downstream and bifurcates about the deflecting bar 48, it is divided into two discrete paths by the divider 56 and continues downstream within the extruder 20 until it impinges upon the upper frusto-conical surface of the cutter disc 42. (It will be noted that the cutter disc 42 remains relatively stationary throughout the extrusion process). If the actuating lever 36 is pivoted about the pivot 38 in a manner to position the cutter sleeve 30 with the cutter edge 32 thereof extending beyond the radially outermost edge of the cutter disc 42, as shown in phantom in FIG. 2, the extrudable mixture will be retained within the extruder 22.

As the actuating lever 36 is operated to raise the cutter sleeve 30, the cutter sleeve exposes the interior of the two discrete extrusion chambers 58a, 58b formed within the lower end of the extruder 20 by the construction and arrangement of the divider 56 relative to the cutter disc 42 at the downstream end and the relation thereof at the upstream end with the deflecting member 52. This exposing of the extrusion chambers 58a, 58b permits extrusion of the extrudable mixture being formed in part by the shape of the lower edge 28 of the nozzle body 22 and in part by impinging against and being formed by the upper, frusto-conical surface of the cutter disc 42.

When sufficient extrudable material has been extruded from the extruder 20 to result in a product of the desired size, the actuating lever 36 is operated to once again move the cutter sleeve 30 from the position shown in full lines in FIGS. 1 and 2 to the position shown in phantom in FIG. 2. This movement causes a cutting off of the communication between the extrusion chambers 58a, 58b and the exterior of the extruder and also causes two extruded products $P_1$ to fall away from the extruder as may be seen in FIG. 1.

The apparatus for controlling the operation of the actuating lever 36, the length of time during which the nozzle opening remains open and the frequency with which the cutter sleeve 30 is reciprocated may all be controlled by apparatus well-known in the art, or it may be manually controlled. In a like manner, the rate and manner of feed of the extrudable material including the pressure placed thereon by the rate and manner of feed of said extrudable material may be controlled in any one of a number of ways well-known in the art. Alternately, the extrudable material may simply be gravity-fed depending upon the nature of the extrudable material, the amount of such material contained within the source in communication with the extrusion chamber 58 and the shape or form of the desired extruded product $P_1$.

The extruder 64 shown in FIGS. 5 and 6 is operated to form two extruded products $P_1$ similar to the extruded products $P_1$ formed by the extruder 20 as shown in FIG. 1 though the implementing structure is somewhat modified. In the extruder 64 of FIGS. 5 and 6, the cutter disc 78 is movable relative to a stationary nozzle body 66 during formation of the extruded product $P_1$.

In the "normal" position of the extruder 64, pressurized fluid such as air is introduced through conduit 98 into double acting air cylinder 92 to impinge upon the piston therein and move the piston rod 90 and the mounting rod 80 connected therewith in an upward direction. Such movement of the mounting rod 80 closes off the nozzle opening of the extruder 64 by virtue of the interconnection described hereinbefore and the cutter disc 78 moving up to the position illustrated in phantom in FIG. 6.

The extrudable material is introduced into the extrusion chamber 74 of the nozzle body 66 through the conduit 76 which is connected in communication with the source of supply of said extrudable material.

At an appropriate time, controlled either by well-known mechanical, electrical or pneumatic operating devices including timers, or controlled manually, operating fluid such as air is introduced into the double-acting air cylinder 92 through the conduit 96 thereby forcing the piston therein and the associated mechanism including the mounting rod 80 and the cutter disc 78 downward. The downward movement opens the plurality of nozzle openings formed by the divider 82 and permits the beginning of the extrusion process to form the two formed food products $P_1$.

As with the extruder 20 described hereinbefore, the products $P_1$ to be extruded from the extruder 64 have their shape determined by numerous variables. Such variables include the nature of the extrudable material, the pressure placed thereon, the length of time during which the plurality of nozzle openings are exposed and the extrudable material is permitted to be extruded therefrom and the shape of the upper, frusto-conical surface of the cutter disc 78 on which the extruding material impinges upon exiting from the extruder 64.

Upon a predetermined amount of extrudable material being extruded from the plurality of extrusion nozzles contained in the extruder 64, the double-acting air cylinder 92 is actuated by introducing pressurized fluid therein through conduit 98 causing the piston rod and apparatus connected thereto including the cutter disc 78 to move upward until the cutter disc 78 assumes its normal position as shown in phantom in FIG. 6. The upward movement of the cutter disc 78 severs the two formed extruded products $P_1$ from the extruder 64 permitting them to fall onto a conveyor belt or the like for further processing if the same is desired.

Figure 4:
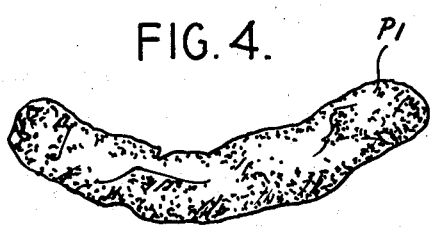
FIG. 4 is an enlarged top view of a formed arcuate solid extruded from the extruder and forming member shown in FIG. 1.

By virtue of the specific shape of the upper frusto-conical surface of the cutter disc 78 and the shape and location of the cutter edge 68 of the nozzle body 66, the product $P_1$ formed by the extruder 64 including the cutter disc 78 has the general arcuate solid or toroid segment shape as shown in FIGS. 1 and 4. As may be noted by reference to FIG. 4, the shape is generally that of an arcuate solid or a toroid segment though the surface of the product $P_1$ is not completely smooth. This irregular surface is due to the pieces of resilient clam particles contained within the extrudable mixture and, as noted hereinafter, is desirable for imparting a realistic appearance to the simulated clam strip.

As may be noted by reference to FIG. 4, the final shape of the product $P_1$ is not precisely that of the nozzle opening but, in the other hand, is in the shape of an arc with a greater radius than the nozzle opening from which it emerged. The reason for the difference in shape between the nozzle opening and the product $P_1$ is due in part to the nature of the material, in part to the nature of the extrusion or forming process and in part to the effects of gravity upon the forming product.

If it is desired to form an extruded product $P_2$ such as is shown in FIG. 9 which includes a more irregular or non-uniform surface than the product $P_1$ shown in FIG. 4, the cutter disc 42 or 78 shown in FIGS. 1, 2, 3, 5 and 6 can be replaced. In its stead a cutter disc can be used of the type shown in FIGS. 7 and 8 designated by the reference numeral 100 and FIG. 10 designated by the reference numeral 108.

As may be seen by reference to FIGS. 7, 8 and 10, the alternate form of the cutter disc 100 or 108 is somewhat thicker in longitudunal extent than is the cutter disc 42 or 78 but is of substantially the same transverse or radial extent as the interior of the cutter sleeve 30 (see FIG. 7) or the interior of the nozzle body 66 (see FIG. 10).

It should be noted that the cutter disc 100 is shown in FIG. 7 as abutting the downstream end of the mounting rod 44 (see FIG. 7) and that the upper section of the extruder 20 is substantially the same as is shown in FIG. 1 described hereinbefore.

In a like manner, the cutter disc 108 is shown affixed to the downstream end of the mounting rod (see FIG. 10) and the upper section of the extruder 64 is substantially the same as shown in FIG. 5 described hereinbefore.

The extrudable material travels downstream within the chamber 58 defined by the nozzle body 22 and bifurcates about deflecting bar 48 in the manner described hereinbefore and divides into two discrete sources of supply for the discrete nozzle openings by virtue of the existence of the divider 56. The extrudable mixture impinges upon the ridges which are the upper generally frusto-conical surface of the cutter disc 100, and also impinges upon the depressions 106 therebetween filling said depressions with said extrudable material.

When the cutter sleeve 30 is raised in the manner noted hereinbefore, the extrudable material begins to extrude from the plurality of nozzle openings. The extruding mixture is shaped at least in part by the plurality of forming members which the divider 56 has fashioned from the cutter disc 100.

When the products $P_2$ attain the desired, predetermined size by virtue of being formed at least in part by the ridges and depressions of the cutter disc 100, they assume, in addition to the normal surface irregularities by virtue of containing resilient clam particles therein, the additional non-planar surface imparted to them by the aforementioned ridges and depressions of the cutter disc resulting in more natural, clam-strip-appearing product $P_2$.

When the products $P_2$ are of sufficient size, the actuating arm 36 is operated to move the cutter sleeve 30 to the position shown in phantom in FIG. 7. The cutter edge 32 and the interior of the cutter sleeve 30 coact with the longitudinally extending wall 104 of the cutter disc 100 to stop the flow of extrudable material from the plurality of extruder nozzles and also cut off the extruded plurality of products $P_2$ in a manner similar to that described hereinbefore relative to the operation of the cutter disc 42.

The cutter disc 108 which is affixed to the downstream end of the mounting rod 80 is constructed and arranged and functions in a manner substantially similar to the construction, arrangement and functioning of the cutter disc 100 described hereinbefore with respect to the extruder 20 with the exception that the cutter disc 108 is mounted relative to the extruder 64.

What has been described herein are alternate embodiments of an extruder for simultaneously forming a plurality of food products of an extrudable material having resilient particles therein from a single source of said extrudable material. Naturally, while the embodiments of the extruders specifically shown and described herein have been shown with divider members which divided a single extrusion nozzle into two extrusion nozzles, dividers could be fashioned and would be within the purview of the present invention wherein three or more discrete extrusion nozzle openings and three or more discrete forming members would be formed thereby permitting simultaneous extrusion of three or more formed food products with each operation of the subject extruder.

In addition, the shape of the extruded product can be changed by changing the shape of the extrusion chamber and may be further changed by variations in the shape and configuration of the nozzle opening, the upper formation-aiding surface of the cutter disc as well as by numerous other variables.

The single most outstanding advantage which is achieved by the subject invention is the provision of an extruder capable of extruding a plurality of formed food products from a mixture containing resilient particles therein from a single source of said mixture. The difficulty with prior attempts at extruding a plurality of formed food products from a single source of said extrudable mixture has been solved, i.e. of maintaining the divider means free of accumulated resilient particles as the extrudable mixture flowed thereabout.

The deflecting bars or members 48, 88 of the present invention, by virtue of being generally rounded in their upstream configuration and in contact with the upstream end of the respective dividers 56, 82, prevent any buildup or accumulation of the resilient particles on the upstream end of the dividers.

The prevention of buildup of the resilient material contained within the extrudable mixture permits simultaneous, economic formation of a plurality of final food products $P_1$ or $P_2$ which can contain larger pieces of clams thereby imparting a more appealing chewiness or "bite" to the finished product.

In addition, greater varieties of clams can be used and pieces of processed clams normally discarded and not used can be utilized thereby reducing waste.

Further, the lack of accumulation of the resilient pieces of clam particles on the extruding mechanism tends to greatly decrease operating costs. The extruders embodying the present invention operate for far longer periods of time without being shut down for cleaning of accumulated resilient particles from divider means thereof.

Naturally, while the present invention has been described for the extrusion of formed food products including clams therein, the apparatus is equally usable for the extrusion of food products containing other resilient particles such as squid or the like as well as "stringy" or fibrous vegetable products such as celery or asparagus.

If desired, the present invention can combine other extruding and food-forming materials such as by including within the extrudable mixture a gel-forming agent such as sodium alginate. The exterior of the formed food product $P_1$ or $P_2$ can be bathed, by any appropriate apparatus, with a supply of gelation agent such as algin gum or the like thereby assisting the formed food products $P_1$ or $P_2$ in retaining their shape through further processing such as battering, breading, frying or the like.

As will be readily apparent to those skilled in the art, the invention may be used in other specific forms or for other related purposes without departing from its spirit or essential characteristics. The present embodiments are, therefore, to be considered as illustrative and not restrictive, the scope of the invention being indicated by the claims rather than by the foregoing description, and all changes which come within the meaning and range of equivalence of the claims are therefore intended to be embraced therein.

What is claimed is:

1. An extruder for simultaneously forming a plurality of food products from an extrudable mixture having resilient particles therein comprising, a source of said extrudable material, a nozzle body terminating in a nozzle opening and defining an extrusion chamber adapted to be connected in communication with said source, means for controlling the amount of said extrudable material to be extruded through said nozzle opening including a product-forming member mounted in operative relation to said nozzle opening and coacting therewith in the formation of said plurality of food products, divider means mounted in operative relation to said nozzle opening and said product-forming member and constructed and arranged to divide said nozzle opening into a plurality of discrete nozzle openings and to correspondingly divide said product-forming member into a plurality of discrete product-forming members each connected in communication with said source and each forming one of said plurality of food products, said divider means extending upstream within said extrusion chamber and terminating at an upstream end spaced from said product-forming member and a deflecting member on said divider means at said upstream end thereof and constructed and arranged to ensure a smooth flow of said extrudable material from said source through said extrusion chamber toward said plurality of nozzle openings and for preventing accumulation of said resilient particles on said upstream end of said divider member.

2. The invention according to claim 1, said product-forming member including a generally frusto-conical upstream surface thereof being constructed and arranged to coact with said extrudable material to aid in the formation thereof.

3. The invention according to claim 1, said product-forming member including a generally frusto-conical upstream surface and also including surface irregularities therein constructed and arranged for producing a formed food product having an irregular surface configuration.

4. The invention according to claim 3 wherein said surface irregularities are a plurality generally of hemi-cylindrical depressions within said product-forming member confronting said extrusion chamber.

5. The invention according to claim 1, said means for controlling the amount of said extrudable material including a relatively stationary cutter disc and a relatively movable cutter sleeve constructed and arranged to coact to periodically open and close said nozzle openings.

6. The invention according to claim 1, said means for controlling the amount of said extrudable material to be extruded through said nozzle openings including a relatively fixed nozzle body and a relatively movable cutter sleeve constructed and arranged for movement relative to said nozzle body for periodically opening and closing said nozzle openings.

7. The invention according to claim 1 wherein said divider means includes a dividing member extending upstream to an upstream end and being substantially radially coextensive with the interior of said extrusion chamber, said deflecting member being substantially equally radially coextensive with said upstream end of said dividing member and including a generally convex downstream upper configuration.

8. In an extruder for simultaneously forming a plurality of food products from an extrudable material having fibrous particles therein from a source of said extrudable material, a nozzle body terminating in a nozzle opening and defining an extrusion chamber adapted to be connected in communication with said source, means for controlling the amount of said extrudable material to be extruded through said nozzle opening including a product-forming member mounted in operative relation to said nozzle opening and coacting therewith in the formation of said plurality of food products, relatively thin divider means mounted in operative relation to said nozzle opening and said product-forming member and being constructed and arranged to divide said nozzle opening into a plurality of discrete nozzle openings and to correspondingly divide said product-forming member into a plurality of discrete product-forming members each connected in communication with said source and each forming one of said plurality of food products, the improvement comprising said divider means extending upstream within said extrusion chamber and terminating at an upstream end spaced from said productforming member and a deflecting member on said divider means at said upstream end thereof, said deflecting member constructed and arranged to ensure a smooth flow of said extrudable material from said source through said extrusion chamber toward said plurality of nozzle openings and for preventing accumulation of said fibrous particles on said upstream end of said divider member.

* * * * *